United States Patent [19]

Lisse

[11] 4,328,293

[45] May 4, 1982

[54] ELECTROCHEMICAL GENERATORS

[75] Inventor: Jean-Pierre, J. Lisse, Athis-Mons, France

[73] Assignee: Automobiles Citroen and Automobiles Peugeot, Paris, France

[21] Appl. No.: 197,015

[22] Filed: Oct. 15, 1980

[30] Foreign Application Priority Data

Oct. 16, 1979 [FR] France .............................. 79 25711

[51] Int. Cl.³ ............................................ H01M 2/20
[52] U.S. Cl. .................................... 429/149; 429/161; 429/185
[58] Field of Search ............... 429/161, 223, 230–231, 429/149, 153, 206, 158, 233, 236, 241, 242, 245

[56] References Cited

U.S. PATENT DOCUMENTS

| | | | |
|---|---|---|---|
| 1,821,768 | 9/1931 | Pouchain | 429/234 X |
| 2,251,913 | 8/1941 | Brennan | 429/234 X |
| 2,361,378 | 10/1944 | Brennan | 429/223 X |
| 2,696,515 | 12/1954 | Koren et al. | 429/235 X |
| 2,727,083 | 12/1955 | Hollman et al. | 429/231 X |
| 2,851,512 | 9/1958 | Andre | 429/131 |
| 3,069,486 | 12/1962 | Solomon et al. | 429/229 |
| 3,226,260 | 12/1965 | Drengler | 429/229 X |
| 3,272,653 | 9/1966 | Solomon et al. | 429/229 X |
| 3,505,113 | 4/1970 | Merten et al. | 429/51 |
| 3,625,766 | 12/1971 | Paine | 429/142 |
| 3,923,544 | 12/1975 | Berchielli | 429/219 |

FOREIGN PATENT DOCUMENTS

| | | |
|---|---|---|
| 361306 | 12/1905 | France . |
| 885666 | 5/1943 | France . |
| 926470 | 4/1947 | France . |
| 1134351 | 4/1955 | France . |
| 2270684 | 12/1978 | France . |

OTHER PUBLICATIONS

French Pat. No. 35,729, dated Jul. 5, 1928.
German Pat. No. 1 956 574, dated Nov. 11, 1969.

Primary Examiner—Anthony Skapars
Attorney, Agent, or Firm—Stevens, Davis, Miller & Mosher

[57] ABSTRACT

The generator comprises elements mounted in series, each element comprising cells mounted in parallel, each cell comprising a positive electrode composed of a substantially rectangular conductive support, a negative electrode composed of a substantially rectangular conductive support and an electrolyte solution. Each electrode conductive support is connected, notably by welding, over a whole side or the major portion of a side to a metal wire serving as an electrical conductor for said electrode. The generator is useful for supplying electrical traction motors.

7 Claims, 7 Drawing Figures

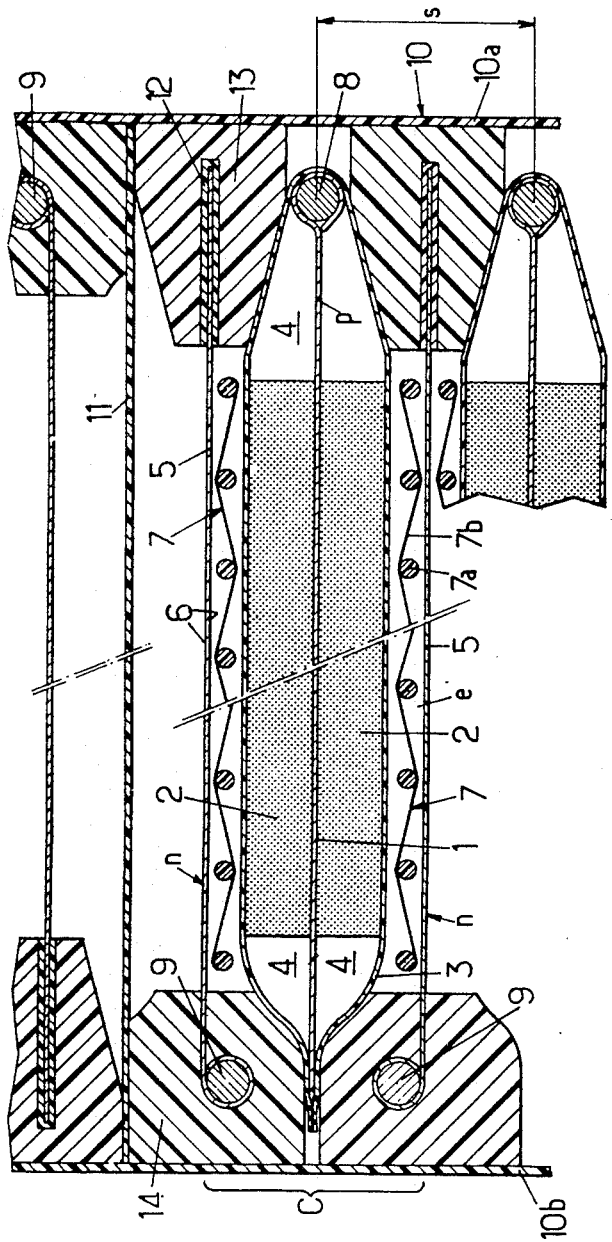
Fig.2.
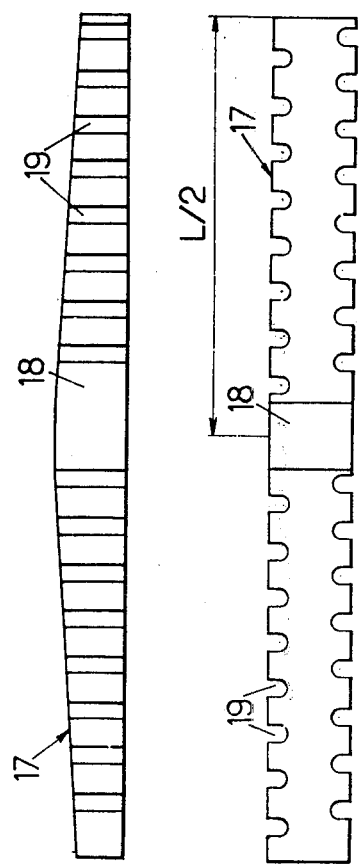
Fig.3.
Fig.4.

ELECTROCHEMICAL GENERATORS

BACKGROUND OF THE INVENTION

Field of the Invention

The invention relates to improvements in or to electrochemical generators of the type which comprise one or several elements mounted in series, each element comprising one or several cells mounted in parallel, each cell comprising:

a positive electrode surrounded by a chemically inert separator, a negative electrode, and an electrolyte solution.

The invention relates more particularly, but not exclusively, to such electrochemical generators intended to supply an electrical traction motor.

It is a particular object of the invention to render these electrochemical generators such that they respond better to the various exigencies of practice than hitherto and notably such that their life span is increased.

GENERAL DESCRIPTION OF THE INVENTION

According to the invention, an electrochemical generator of the previously defined type is characterized by the fact that each electrode is composed of a conductive support equipped with a layer of active material, notably deposited chemically or electrolytically, and that each electrode conductive support is connected, notably by welding, along the whole or the major part of one side to a metal wire serving as an electrical conductor for said electrode.

Advantageously, one edge of the electrode conductive support is wound around the metal wire, over the whole (or the major part) of its length.

The conductive support of the positive electrode may be formed by a nickel gauze or perforated and nickeled copper strip and comprise, on its two surfaces, a porous nickel sintered element impregnated with nickel nitrate, which nickel nitrate is converted into solid nickel hydroxide filling the pores of the sintered element then into nickel oxyhydroxide whilst the conductive support of the negative electrode is composed of a copper strip on which is deposited an electrolytic zinc layer, the electrolyte being constituted by a potash solution.

The electrode supports are generally arranged in parallel planes, notably vertical, whilst the conductive metal wires for the electrode supports of a same polarity are arranged and assembled on the same side, and the conductive metal wires for the electrode supports of the opposite polarity are arranged and assembled on the opposite side, the generator including several elements mounted in the same tank, the adjacent elements being positioned so that the conductive metal wires of one element, of a given polarity, are situated on the same side as the wires of opposite polarity of the other adjacent element; advantageously the placing of the conductive wires of a same polarity of a same element in parallel, and the placing in series of this set of wires with the set of wires of opposite polarity of the adjacent element are ensured by a metal bar including notches adapted to receive the end of the conductive wires, the notches being notably arranged in quincunx on two opposite longitudinal sides of the bar and the conductive wires of a set of a same polarity have their ends arranged alternately on one side and the other of the bar and crimped and/or welded in the notches.

The elements of the electrochemical generator are placed in the compartments of a tank, separated by vertical partitions, the whole being covered by a lid, notably of plastics material. A seal is provided to surround each bar in its central portion situated between the sets of conductive wires of opposite polarities. This seal advantageously includes, at its lower portion, a groove in which the separating partition between the compartments is engaged, the lid being arranged to be supported on the separating partition and including, on each side, a groove to house the above-mentioned connecting bars.

These bars have, preferably, a substantially rectangular cross-section, maximum at their central portion. The seal surrounding each bar has the shape of a substantially rectangular ring engaged around its central portion.

The lateral ends, of which one is connected to the conductive wire, of each negative and/or positive electrode are coated with a plastics and/or elastic insulating material.

A grid, acting as a chemically inert spacer, notably of woven or extruded or thermoformed plastics material, is advantageously arranged on each side of the positive electrode, between the separator enveloping the latter and the negative electrode. A space is thus defined on each side of the negative electrode, this space being limited, in the vicinity of the lateral ends of the electrode, by the coatings of insulating material of the negative electrode, said space enabling the circulation of the electrolyte.

The assembly is arranged so that a distributing chamber for the electrolyte is formed in the lower part of the tank; a chamber is also formed in the upper part of the tank.

The invention combines, in a way, the following characteristics:

each electrode is constituted by a thin layer deposited on a conductive support, electrolytically or chemically;

each electrode permits a conductive lead connected or welded over the whole length of one side.

The active layer being very thin with respect to the thickness of the support and to the diameter of the wire, the conjugation of the two above-mentioned characteristics has the result that the current lines in the active portion of the electrode are parallel with one another, which corresponds to optimal exploitation of the electrode.

The invention consists, apart from the above-described features, of certain other features which will be more explicitly discussed below with respect to a particular embodiment described with reference to the accompanying drawings, but which is not to be considered as in any way limiting.

BRIEF DESCRIPTION OF THE DRAWINGS

FIG. 1a shows, on a larger scale, a detail of FIG. 1.

FIG. 2 is a partial section on an enlarged scale along the line II—II of FIG. 1.

FIG. 3 is a view in elevation of a connecting bar.

FIG. 4 is a plan view of the bar of the FIG. 3.

FIG. 5 is a partial view, in elevation, of a generator, according to the invention, connected to a pump for circulating electrolyte during recharging.

FIG. 6, lastly, is a plan view with respect to FIG. 5.

DESCRIPTION OF A PREFERRED EMBODIMENT

Figure 1:
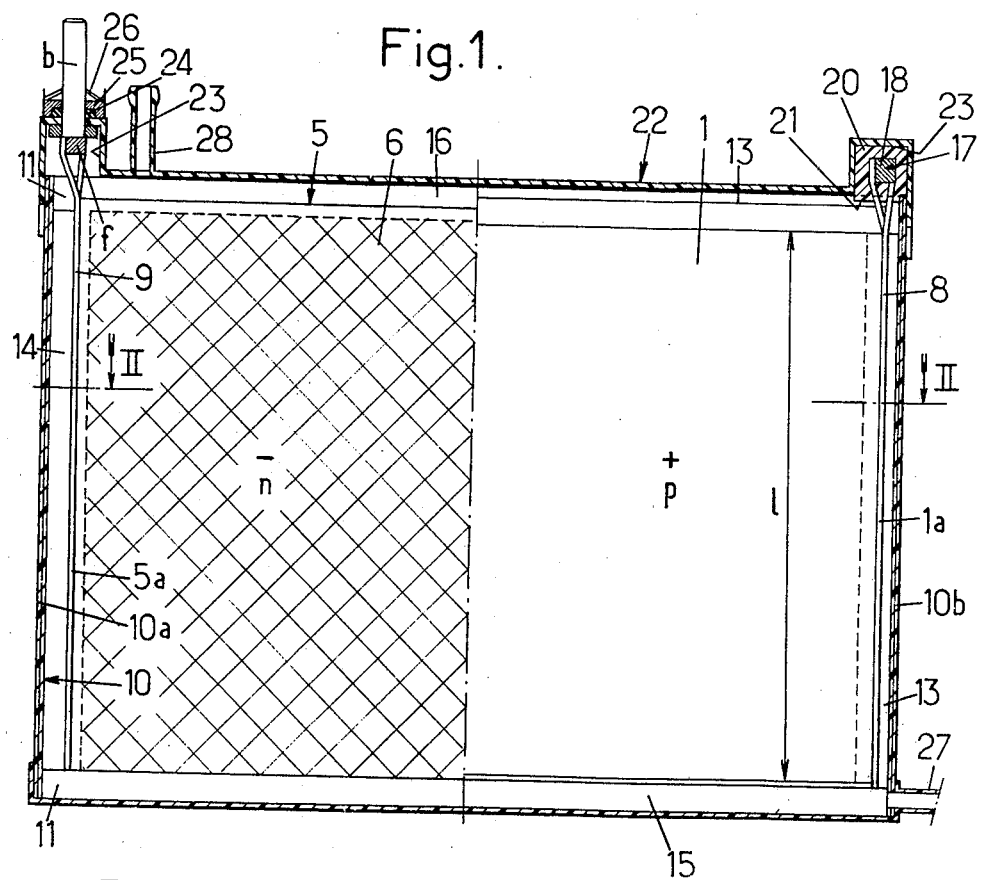
FIG. 1, of the drawings, shows, in vertical section, along two offset planes, an embodiment of an electrochemical generator according to the invention.

Referring to the drawings, notably to FIGS. 1 and 2, an electrochemical generator comprising several elements can be seen, each element comprising several cells such as C (FIG. 2).

Each cell comprises a positive electrode p and a negative electrode n; more precisely, two negative electrodes n limit the cell C, the positive electrode p being comprised between these two negative electrodes n of which only one surface belongs to the cell C.

Each positive electrode p is composed of a substantially rectangular support 1 formed by a nickel gauze or by a perforated thin strip of nickeled copper. A porous nickeled sintered element 2 is formed on the two surfaces of the support; this nickel sintered element 2 is impregnated with nickel nitrate which is converted into solid nickel hydroxide, filling the pores of the sintered element, then into nickel oxyhydroxide which serves as active material for the positive electrode p.

Each positive electrode p, of which the sintered element 2 has been impregnated through its thickness, is enclosed in a small bag 3 of micro-porous plastics material, open at its upper part constituting a chemically inert separator which surrounds the positive electrode. This small bag 3 can be open on one or both sides to permit the introduction of the positive electrode. The edges of the bag are then welded so that the positive electrode is held in a pocket open at its upper part. The micro-porous plastics material of the bag 3, forming a separator, whilst protecting the positive electrode permits the passage of the electrolyte and the coming into punctual contact of the electrolyte with the active material of the electrode p.

It can be noted that the nickel sintered element 2 does not extend to the lateral ends of the support 1 as seen in FIG. 2 so that free spaces such as 4 exist on each side of the sintered element, between the bag 3 and the support 1.

The negative electrode n is composed of a substantially rectangular conductive support 5 composed of a copper strip on which a thin electrolytic zinc layer 6 is arranged constituting the active material of the negative electrode.

A grid 7, of chemically inert material, notably of plastics material, is arranged on both sides of the electrode n as can well be seen in FIG. 2. The grid 7 enables a space e to be arranged for the electrolyte between the negative electrode n and the separator 3. The grid 7 permits, in addition, the assurance at the same time of a certain turbulence and an equivalent flow rate in all the cells C arranged in parallel of the same element, offering a low pressure drop and high ionic permeability perpendicular to the electrodes.

The grid 7 is, preferably, constituted by an assembly of threads or filaments, of woven or fretted or thermoformed plastics material; the threads 7a arranged vertically have a diameter close to the width of the space e; these vertical threads 7a are held by finer horizontal threads 7b, whose diameter is minimum for the desired mechanical strength.

The electrolyte is formed by a potash solution.

The conductive support 1 or 5, of each electrode p or n, is connected, notably by spot welding, over the whole or the major portion of a side 1a or 5a (FIG. 1) to a metal wire 8, 9, serving as an electrical lead for the electrode concerned. An electrical contact is hence established between the conductive wire and the associated electrode over the whole length 1 (FIG. 1) of the side concerned.

Generally, the supports 1 and 5 of the positive p and negative n electrodes are arranged in parallel vertical planes. The edge 1a, 5a, along which each support is connected to the conductive wire, is formed by one of the vertical lateral edges of the support.

Preferably, the electrode support 1, 5 is wound around the wire 8, 9, as visible in FIG. 2. The edges of the supports 1, 5, of the electrodes are welded to the conductors 8, 9, which ensures excellent contact.

The pitch s (FIG. 2) between two consecutive wires such as 8, is advantageously in the vicinity of 2 mm.

The electrodes work homogeneously, over the whole of their surface, without a current peak density being produced, due to the fact of the contact established with the conductors 8, 9, over the whole height. There is, as a result, an increase in the life span of the generator.

The cells C of the elements of a same generator are arranged in the same tank 10 of chemically inert material, notably of plastics material; compartments are created in this tank, and separated in fluid-tight manner by separating partitions 11 arranged between the various elements of the generator. The cells comprised between two parallel partitions 11 belong to the same element, and these cells are connected in parallel. The said partitions 11 are supported against the lateral walls 10a, 10b and the bottom of the tank 10.

The lateral edges of the negative electrodes n, as seen in FIG. 2, are protected by a layer of insulating varnish 12 and/or by individual overmoldings or coatings 13, 14, formed of a plastics and/or elastic insulating material resistant to the electrolyte. These overmoldings extend over the whole height of the electrodes; the overmolding 14 is provided on the edge connected to the conductor 9. In the illustration of FIG. 2, no insulating varnish layer is provided to protect the edge of the electrode n connected to the conductor 9, the overmolding 14 being sufficient to ensure this protection.

The coatings 13 and 14 are applied, in fluid tight manner, against the walls 10a, 10b of the tank. These coatings 13, 14 isolate, from the walls 10a, 10b of the tank, the electrolyte contained notably in the spaces e. These walls 10a, 10b, at right angles to the separating partitions 11, are preferably, inclined with respect to the horizontal, so that the distance between the walls 10a, 10b, is greater at the upper part of the tank than at the lower part. The angle of inclination of the walls 10a, 10b, with respect to the horizontal or clearance angle is, preferably equal to 89°; this inclination facilitates the introduction of the stack of electrodes, separators and grids.

Each element of the generator, formed by a plurality of cells, rests on these inclined walls 10a, 10b through overmoldings 13, 14, which have the same clearance angle as the walls. The conductors 8, 9 and the supports 1, 5, are thus isolated from the walls 10a, 10b.

As seen in FIG. 1, the lower part of the elements stops above the lower wall of the tank 10 so that a chamber 15 for distributing the electrolyte between the various spaces e, is formed. An outlet chamber 16, for electrolyte, is arranged in the upper part of the tank.

Each space e forms a vertical duct for the electrolyte, limited laterally by the overmoldings 13, 14.

The electrodes n and p are arranged so that the conductive wires 8 and 9 of a same polarity are situated and assembled on a same side. In FIGS. 1 and 2 the conductors 8 of the positive electrodes of the cells of a same element are situated on the right, whilst the conductors 9 of the negative electrodes of the cells of a same element are situated on the left. The adjacent elements are arranged in the same tank 10, so that the conductors of opposite polarity, of two adjacent elements, are arranged on a same side. Thus, in the case of FIG. 2, the two adjacent elements to that shown, will be arranged so that their leads 9, associated with the negative electrode are situated to the right, that is to say on the same side as the conductors 8 of the positive electrodes of the other element. At the upper part of FIG. 2, is shown a negative electrode of an adjacent element.

The placing of the conductors of the same polarity of one element in parallel, and the placing in series of the conductors of opposite polarities of two adjacent elements is ensured by a metal bar 17 (FIGS. 3 and 4) for electrical connection. This bar includes on both sides of its central portion 18, notches 19, arranged in quincunx of each of the longitudinal edges of this bar. The half-length L/2 of the bar 17 is substantially equal to the width of a compartment, that is to say to the distance separating two parallel partitions 11. The ends of the various output conductive wires of a same polarity, for example the leads 9 shown in FIG. 2, are housed in the notches 19 of a same half-bar; these ends are situated alternately on one edge and on the other, of the bar. The ends of the leads 8 of the adjacent element are housed in the notches of the other half-bar. The arrangement in quincunx of the notches 19 on each side of the bar facilitates the connection with reduced bulk. The leads may be fixed in the notches 19 by crimping and/or welding. It will thus be understood that each half-bar ensures the placing in parallel of all the leads of same polarity of one element of the generator. The two half-bars, which are fast to one another, ensure the connection in series of the two bundles of leads of opposite polarities of two adjacent elements. The thickness of the bar, as seen in FIG. 3, is minimum at its ends and increases gradually up to its central portion 18 of substantially rectangular cross-section, including rounded corners.

By way of numerical example, it can be indicated that, to obtain an electrochemical generator having a capacity of 120 a-h at a voltage of 13.2 volts, it is necessary to place in series eight elements which each comprises fifteen cells C formed by fifteen positive electrodes p working on the two surfaces and sixteen negative electrodes n of which fourteen work on the two surfaces, whilst the two end negative electrodes only work on a single surface. The bar 17 shown in FIGS. 3 and 4 is designed for such a generator, and each half-bar includes sixteen notches; for such a generator seven bars would be necessary such as 17 and two ends bars such as f (FIG. 1) connecting the output terminals such as b of the generator in parallel to the leads of the same polarity of the two end elements of this generator.

The central portion 18 of the bar is designed to be surrounded, when this bar is put in place in the generator, by a fluid-tight seal 20 (FIG. 1) with substantially rectangular cross-section, with rounded corners including a central opening designed to receive, in fluid-tight manner, the portion 18. This seal is formed of deformable plastics material; it includes, at its lower part, a groove 21 (FIGS. 1 and 1a) oriented perpendicularly to the bar 17 and parallel to the electrodes n and p. This groove 21 is designed to be engaged on the lateral end of the upper edge of the separating partition 11 between the two adjacent compartments, in sealed manner.

The seal 20 is squashed down by a lid 22 closing the tank of the generator; this lid 22 includes on its lateral edges, grooves or channels 23 with a rectangular section adapted to squeeze seals 20 in fluid-tight manner, and to receive the bars 17. This lid 22 is supported, in fluid-tight manner, against the upper edges of the partitions 11 and of the lateral walls 10a, 10b.

The terminals such as b (FIG. 1) of the generator are formed, conventionally, by a cylindrical pin which passes through the bottom of one of the grooves 23 of the lid. The fluid-tightness at the level of this terminal b is obtained with a toric seal 24 encircling the terminal b and situated outside the cover; this seal 24 is squeezed by a washer 25, which is held by a clip washer 26 which is buttressed against the cylindrical wall of the terminal b.

On the tank of the generator are provided nozzles 27, 28 which can be connected, on recharging the generator, to the delivery and to the intake of a pump 29 (FIGS. 5 and 6) for circulating electrolyte. The nozzle 27 is provided at the lower portion of the tank, whilst the nozzle 28 is provided on the lid; the circulation takes place, preferably, from below to above and the nozzle 27 is connected to the delivery of the pump. The nozzle 27 has been shown partially in FIG. 1; it is extended, preferably upwards to the level of the lid 22. The positions of the nozzles 27 and 28 shown in FIGS. 5 and 6 are slightly different from those shown in FIG. 1; however, in these FIGS. 5 and 6, the nozzle 27 is connected by an extension, (not shown), to the lower part of the tank 10. Two nozzles 27 and 28 are provided for each compartment of the generator so as to form as many independent circuits, in the example described, for the circulation of the electrolyte during the charging, as there are elements mounted in series.

The pump 29 is advantageously constituted by a peristaltic pump with several stages independant of one another, each stage being associated with one compartment. In the case of an electrochemical generator with eight compartments, it is possible advantageously to use a peristaltic pump with sixteen stages such that the width of two stages of the pump is substantially equal to the width m (FIG. 6) of a compartment of the generator. It is then possible to place two generators side by side, for recharging, and to ensure the circulation in the sixteen compartments of the two generators through a quincunx connection of the stages of the pump as shown partially in FIG. 6. The electrolyte inlets and outlets for each compartment are substantially opposite each stage of the corresponding pump. The different stages of a pump are fastened together by tie rods 30, 31; the angular offset of the various stages is such that the maximum crushing force on the flexible pipe t of each stage is offset by one stage with respect to another so as to ensure good angular distribution of the opposing torque on the shaft of the pump.

The possibility of circulating the electrolyte during the recharging of the generator, offered by the presence of the nozzles 27 and 28 enables a depassivation of the negative zinc electrode to be ensured by sweeping off the deposits of zinc oxide, a good distribution of the zinc during the recharging by homogenization of the concentration of zincate, and an extraction of the heat disengaged on charging, which leads also to increasing the number of cycles possible with a generator. Naturally, obturation means (not shown) are provided to plug the nozzles 27, 28, when the generator has been charged and placed in service.

The whole of the generator according to the invention is arranged so that the weight and the space occupied are reduced by the maximum amount, and the arrangement of the elements is such that the circulation of the electrolyte, during the recharging of the generator, can be done homogeneously in the various compartments and independantly from one compartment to the other; this arrangement also permits the removal of the gases which can appear on charging.

The present invention therefore permits the production of an electrochemical generator with a negative electrode of zinc, which ensures a high energy density, under the best conditions.

The electrodes operate homogeneously over the whole of their surface, due to their electrical connection over the whole height with the leads.

The fact that the constituent elements of each compartment rest on the inclined walls 10a, 10b enables a distribution chamber 15 and an outlet chamber 16 to be provided in each compartment.

The bars 17 permit three functions to be cumulated: the electrical connection of the conductors, the support and the fluid-tightness between compartments; a lightening of the generator results therefrom. The shape of the lid 22 with two grooves 23 orthogonal to the plane of the electrodes reduces the volume of the whole to the minimum whilst contributing to fluid-tightness between compartments. The electrochemical generator of the invention contains a sufficient amount of the electrolyte to avoid saturation of the zincate and the precipitation of zinc oxide under normal conditions of use.

I claim:

1. An electrochemical generator, comprising at least two elements mounted in series in a tank, each element comprising a plurality of cells mounted in parallel, each cell comprising a positive electrode surrounded by a chemically inert separator, a negative electrode, and an electrolyte solution, each electrode comprising a conductive support having thereon a layer of active material, and an electrical conductor connected to a side of said conductive support, said electrical conductors of a single element having the same polarity being located on one side of the tank, while the electrical conductors of opposite polarity are located on the opposite side of the tank, the conductive wires of the same polarity of a single element being connected in parallel with each other by a conductive bar having notches adapted to receive the ends of the conductive wires and to place in series the conductive wires of opposite polarities of two adjacent elements.

2. An electrochemical generator according to claim 1, in which the notches are arranged in quincunx on two opposite longitudinal sides of the bar and the conductive wires of an element have their ends arranged alternately on opposite sides of the bar.

3. An electrochemical generator according to claim 1, wherein the lateral ends of each negative electrode have a coating of a plastics and/or elastic insulating material, and a lateral end is connected to the conductive wire.

4. An electrochemical generator according to claim 3, wherein a chemically inert grid is arranged on each side of the positive electrode, between the separator enveloping said positive electrode and the negative electrode, a space being thus defined on each side of the negative electrode, enabling circulation of the electrolyte, said space being limited, in the vicinity of the lateral ends of the electrode, by the coating of the negative electrode.

5. An electrochemical generator according to claim 4, wherein the walls of the tank and the negative electrode coatings have the same clearance, said coatings are supported on said walls, and the lower portion of the elements stop above the lower wall of the tank so that a distributing chamber for the electrolyte is formed and an outlet chamber is formed in the upper portion of the tank.

6. An electrochemical generator, comprising:
(a) a tank which is divided into a plurality of compartments by at least one substantially vertical partition and provided with a cover;
(b) a plurality of elements located in the compartments of said tank, each element comprising a plurality of cells comprising a positive electrode surrounded by a chemically inert separator, a negative electrode, and an electrolyte solution, each electrode comprising a conductive support having thereon a layer of active material, and an electrical conductor connected to a side of said conductive support, the cells being located so that a set of electrical conductors of a same polarity are arranged on one side of the compartment while a corresponding set of electrical conductors of opposite polarity are arranged on the opposite side of the compartment, the element being located so that the set of electrical conductors of one element of a given polarity are situated on the same side as the set of electrical conductors of opposite polarity of an adjacent element;

(c) at least one conductive bar with notches arranged in quincunx on two opposite longitudinal sides of the bar, the electrical conductors being connected to said notches to ensure that the elements are connected in series and the cells within an element are connected in parallel, the electrical conductors of one element of the same polarity having their ends arranged alternately on opposite sides of the bar; and (d) a seal surrounding the central portion of each conductive bar, located between the sets of conductive wires of opposite polarities, said seal having a groove in which the separating partition between adjacent compartments is engaged, the cover being located so as to be supported on said separating partition.

7. An electrochemical generator according to claims 1 or 6, wherein a pitch between two consecutive wires is close to 2 mm.

* * * * *